US012297694B2

(12) United States Patent
Liang

(10) Patent No.: US 12,297,694 B2
(45) Date of Patent: May 13, 2025

(54) SAFETY LIFT CORD ASSEMBLY FOR WINDOW BLINDS

(71) Applicant: CHING FENG HOME FASHIONS CO., LTD., Changhua County (TW)

(72) Inventor: Wen Ying Liang, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 221 days.

(21) Appl. No.: 18/092,861

(22) Filed: Jan. 3, 2023

(65) Prior Publication Data

US 2024/0191568 A1 Jun. 13, 2024

(30) Foreign Application Priority Data

Dec. 9, 2022 (TW) ................................. 111147363

(51) Int. Cl.
*E06B 9/326* (2006.01)
*E06B 9/303* (2006.01)
*E06B 9/327* (2006.01)

(52) U.S. Cl.
CPC .............. *E06B 9/326* (2013.01); *E06B 9/303* (2013.01); *E06B 9/327* (2013.01)

(58) Field of Classification Search
CPC .......... E06B 9/326; E06B 9/303; E06B 9/327; E06B 9/384
See application file for complete search history.

(56) References Cited

U.S. PATENT DOCUMENTS 5,769,140 A * 6/1998 Tuzmen .................. E06B 9/305 160/178.3
5,778,956 A * 7/1998 Judkins ................... E06B 9/303 160/176.1 R
5,839,494 A * 11/1998 Judkins ................... E06B 9/303 160/171
5,918,657 A * 7/1999 Tuzmen .................. E06B 9/384 160/168.1 R
8,474,507 B2 * 7/2013 Anthony ............... F16G 11/143 160/84.01

(Continued)

FOREIGN PATENT DOCUMENTS

JP H05179876 A * 7/1993
WO WO-2015155267 A1 * 10/2015 ............. E06B 9/303

*Primary Examiner* — Johnnie A. Shablack
(74) *Attorney, Agent, or Firm* — Ying-Ting Chen; Law Office of Michael Chen

(57) ABSTRACT

A safety lift cord assembly for a window blind includes two ladder strings and multiple transverse strings located between the two ladder strings. The two ladder strings are parallel to each other, and the transverse strings control angular status of slats of the window blind. Two sleeves are located on two ends of the ladder unit. Two lift cords respectively extend through the two sleeves. The first end of each lift cord is fixed to a bottom rail, and the second end of each lift cord is connected to a roller in a top rail of the window blind. Two ropes respectively extend through the two sleeves. Multiple retainers are formed between the ladder strings and the ropes. When the lift cords are lifted, the ropes drive the ladder unit, and the sleeves are collected and is not dragged by the retainers to avoid from being torn or damaged.

7 Claims, 12 Drawing Sheets

(56) References Cited

U.S. PATENT DOCUMENTS

| | | | | |
|---|---|---|---|---|
| 8,684,063 | B2 * | 4/2014 | Lin | E06B 9/326 160/84.01 |
| 8,813,807 | B1 * | 8/2014 | LeBlanc | E06B 9/24 160/84.01 |
| 9,074,409 | B2 * | 7/2015 | Liang | E06B 9/262 |
| 9,447,632 | B2 * | 9/2016 | LeBlanc | E06B 9/24 |
| 9,493,981 | B2 * | 11/2016 | Bishop | E06B 9/262 |
| 10,072,459 | B2 * | 9/2018 | Bowen | E06B 9/384 |
| 2011/0180222 | A1 * | 7/2011 | Huang | E06B 9/262 160/368.1 |
| 2011/0186242 | A1 * | 8/2011 | Foley | B23P 11/00 160/340 |
| 2012/0168094 | A1 * | 7/2012 | Lin | E06B 9/262 160/340 |
| 2013/0048233 | A1 * | 2/2013 | Lin | E06B 9/326 160/168.1 R |
| 2014/0284006 | A1 * | 9/2014 | Liang | E06B 9/303 160/178.1 R |
| 2018/0112460 | A1 * | 4/2018 | Huang | E06B 9/326 |
| 2018/0283095 | A1 * | 10/2018 | Lin | E06B 9/262 |
| 2019/0112872 | A1 * | 4/2019 | Hsu | E06B 9/382 |
| 2019/0277085 | A1 * | 9/2019 | Lin | E06B 9/325 |
| 2021/0032930 | A1 * | 2/2021 | Chen | E06B 9/382 |
| 2021/0317702 | A1 * | 10/2021 | Liang | E06B 9/384 |
| 2024/0191568 | A1 * | 6/2024 | Liang | E06B 9/303 |

* cited by examiner

SAFETY LIFT CORD ASSEMBLY FOR WINDOW BLINDS

BACKGROUND OF THE INVENTION

1. Fields of the Invention

The present invention relates to a window blind, and more particularly, to a safety lift cord assembly of a window blind.

2. Descriptions of Related Art

Most of the window blinds allow the blind to be opened or closed through operation to the cords. Children are curious and often play under the window blind and may be wrapped around their necks by the cords.

In order to improve the shortcomings, Taiwanese Patent No. 501661 and 476385 respectively provide a safety arrangement to the cords and try to avoid these type of tragedies. However, the cords are exposed and can be easily accessed by kids. In addition, as shown in FIG. 10, the parts of the control device of the window blind are worn so that the window blind tilts when operating the cords. The whole set of the window blind needs to be replaced.

The applicant invents safety operating device of the blinds as disclosed in U.S. Patent Publication No. US2021317702A1, which is modularized to make the manufacturing process simpler and easier.

However, the sleeve that the lift cord extends through is only threaded and wound, so that the sleeve is easily torn after frequent use. The same shortcoming is found in U.S. Pat. Nos. 5,918,657, 8,857,493, US20130048233, US20130126105, and US20190277085.

The present invention intends to provide a safety lift cord assembly of a window blind to eliminate the shortcomings mentioned above.

SUMMARY OF THE INVENTION

The present invention relates to safety lift cord assembly for a window, and comprises a ladder unit including two ladder strings and multiple transverse strings which are located between the two ladder strings. The two ladder strings are parallel to each other. The transverse strings control angular status of slats of the window blind. Two sleeves made of flexible material are located on two ends of the ladder unit. Two lift cords respectively extend through the two sleeves. The first end of each lift cord is fixed to a bottom rail of the window blind, and the second end of each lift cord is connected to a roller located in a top rail of the window blind. Two ropes respectively extend through the two sleeves. Multiple retainers are formed between the ladder strings and the ropes. When the lift cords are lifted, the ropes drive the ladder unit and the sleeves are collected, the retainers do not drag the sleeves.

Preferably, each of the ladder strings includes multiple wires which form multiple rings woven with each other. Each of the ropes includes at least two wires braided with each other. Multiple openings are formed between the at least two wires. Each retainer has a first end thereof formed by extracting one of the multiple wires of the ladder string, and the first end of the retainer is woven to one of the openings of the rope and is woven to another one of the rings of the ladder string to connect the ladder string, the retainer and the rope together.

Preferably, each of the ladder strings includes multiple wires which form multiple rings woven with each other.

Each of the ropes includes at least two wires braided with each other. Multiple openings are formed between the at least two wires. Each retainer has a first end thereof formed by extracting one of the multiple wires of the ladder string. The first end of the retainer is woven to multiple openings of the rope and is woven to another one of the rings of the ladder string so as to connect the ladder string, the retainer and the rope together.

Preferably, each of the sleeves is a netted sleeve.

Preferably, each of the sleeves is a flat tube which abuts one of two opposite faces of the slats to reduce light from passing through gaps between the slats.

Preferably, the sleeves are made of yarns woven with each other.

Preferably, the sleeves each have different colors or patterns formed thereon.

The primary object of the present invention is to provide a safety lift cord assembly for a window blind, wherein the safety lift cord assembly is easily to assembled and manufactured. The sleeves are prevented from being torn or damaged when operating the lift cords.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
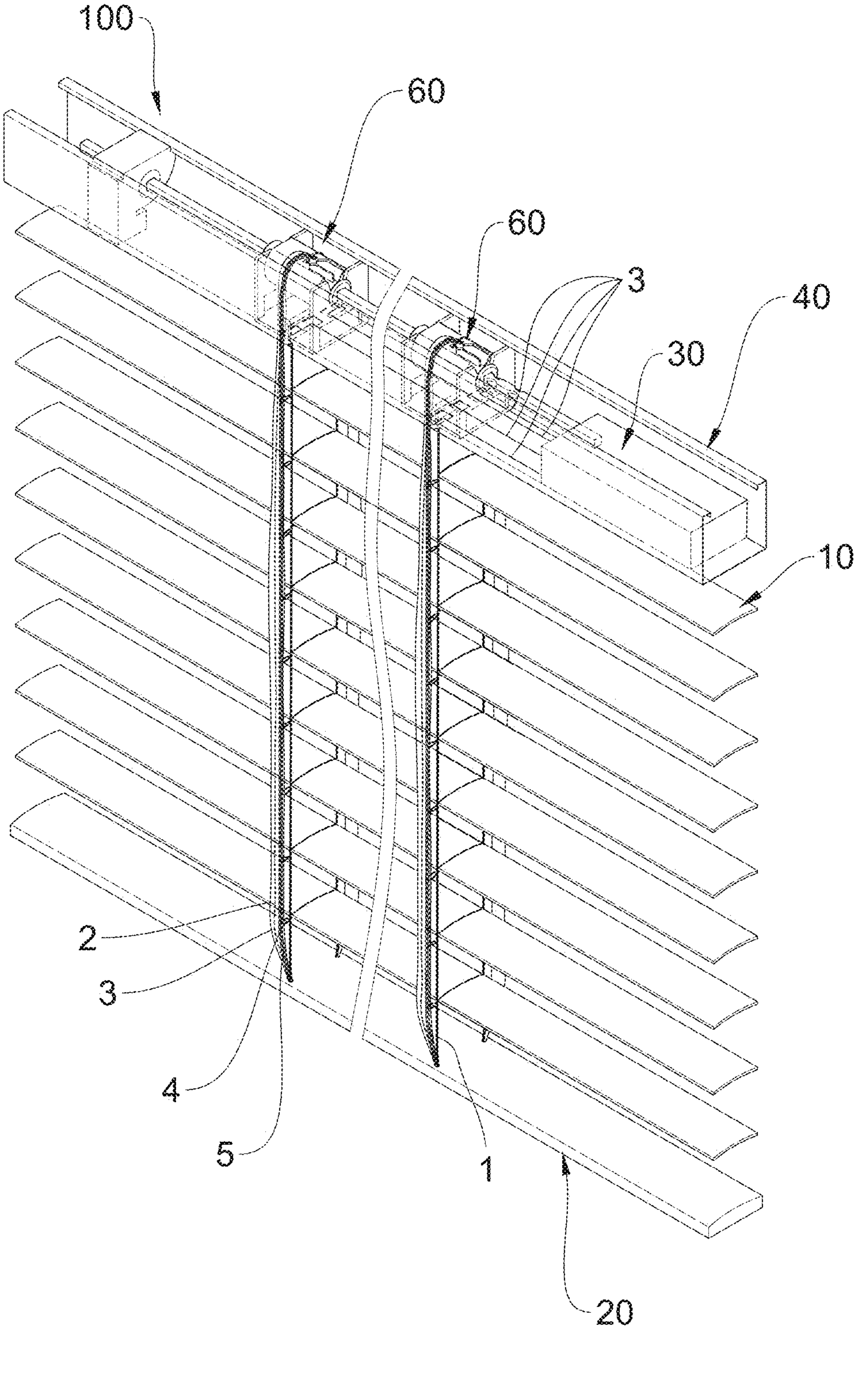
FIG. 1 is a perspective view to show the window blind with the safety lift cord assembly of the present invention.
Figure 2:
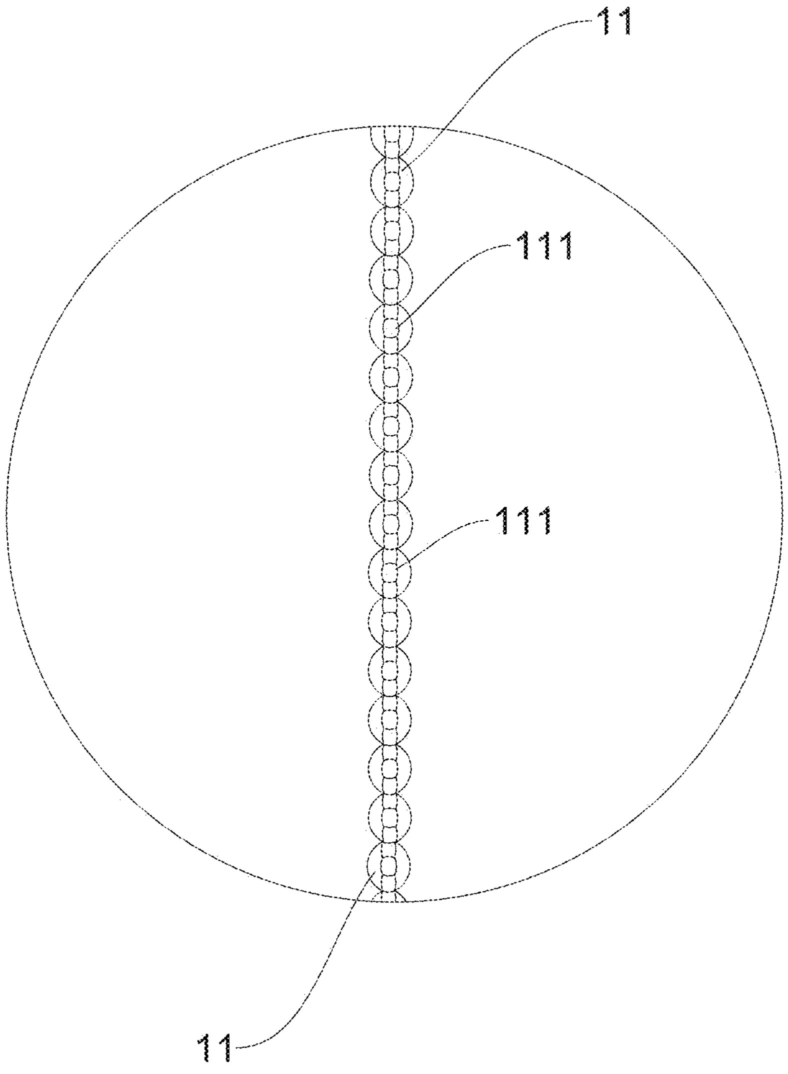
FIG. 2 is an enlarged view to show the ladder string of ladder unit of the present invention.
Figure 3A:
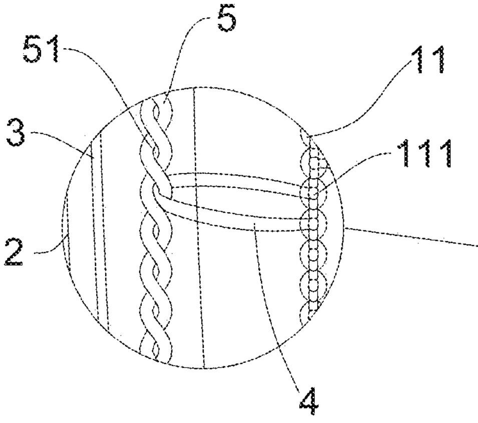
FIG. 3A shows the retainer formed between the rope and the ladder string.
Figure 3:
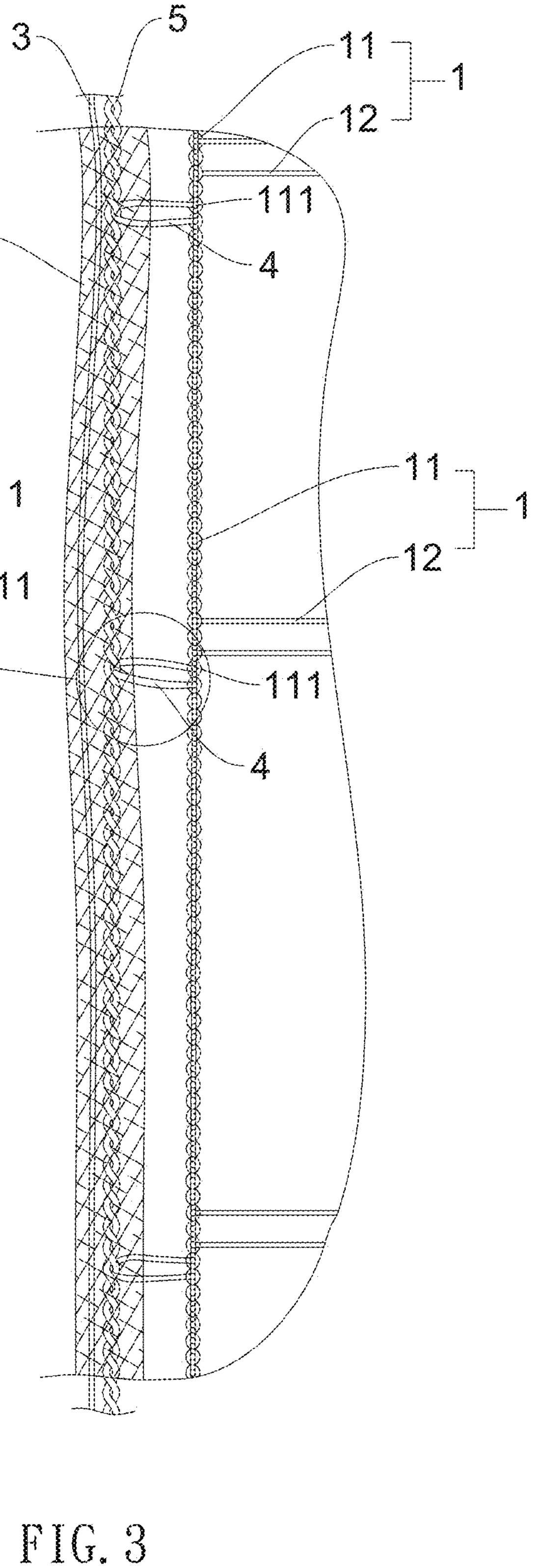
FIG. 3 shows that retainers are located between the ladder string and the rope.
Figure 4:
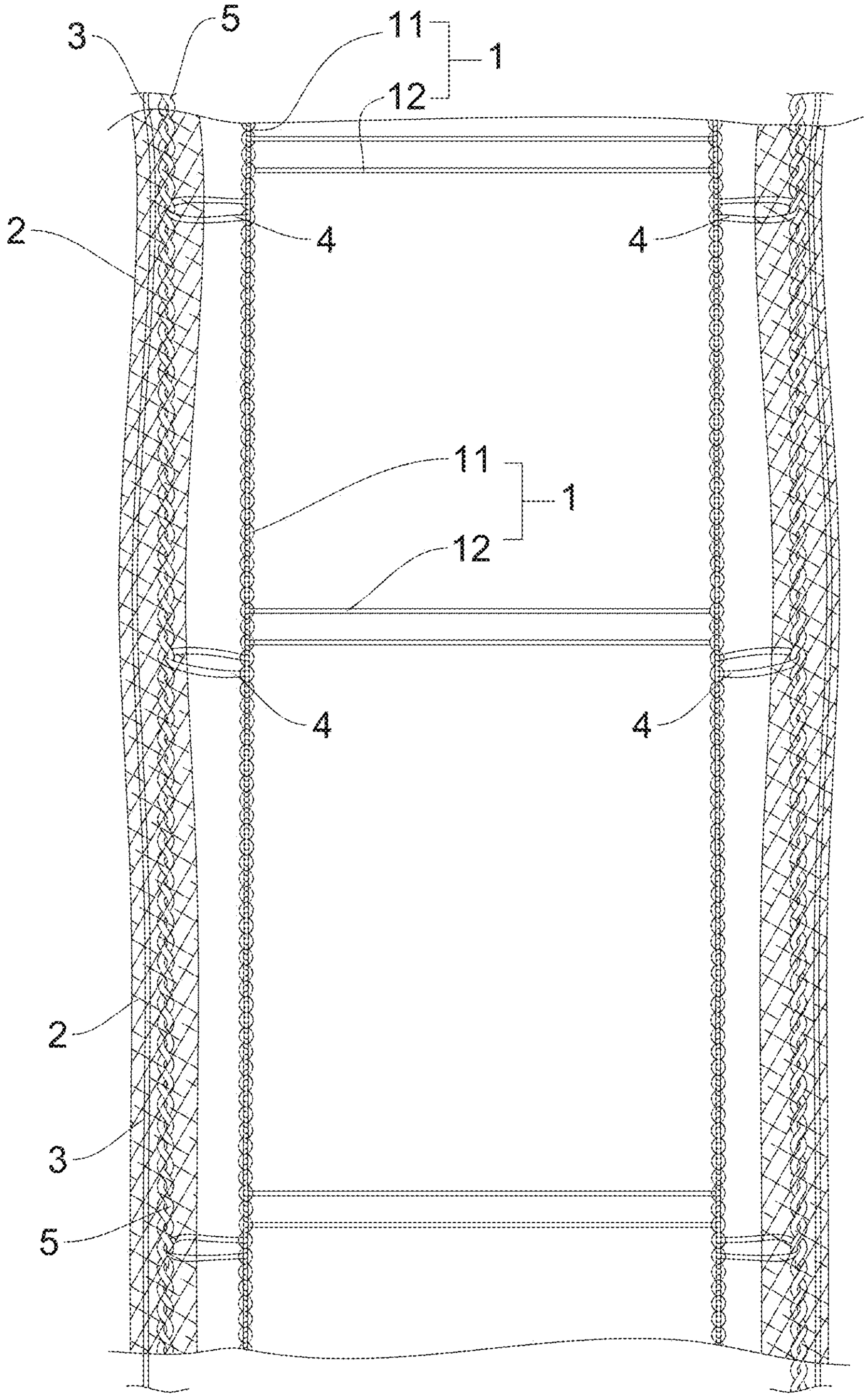
FIG. 4 shows the safety lift cord assembly of the present invention.
Figure 5:
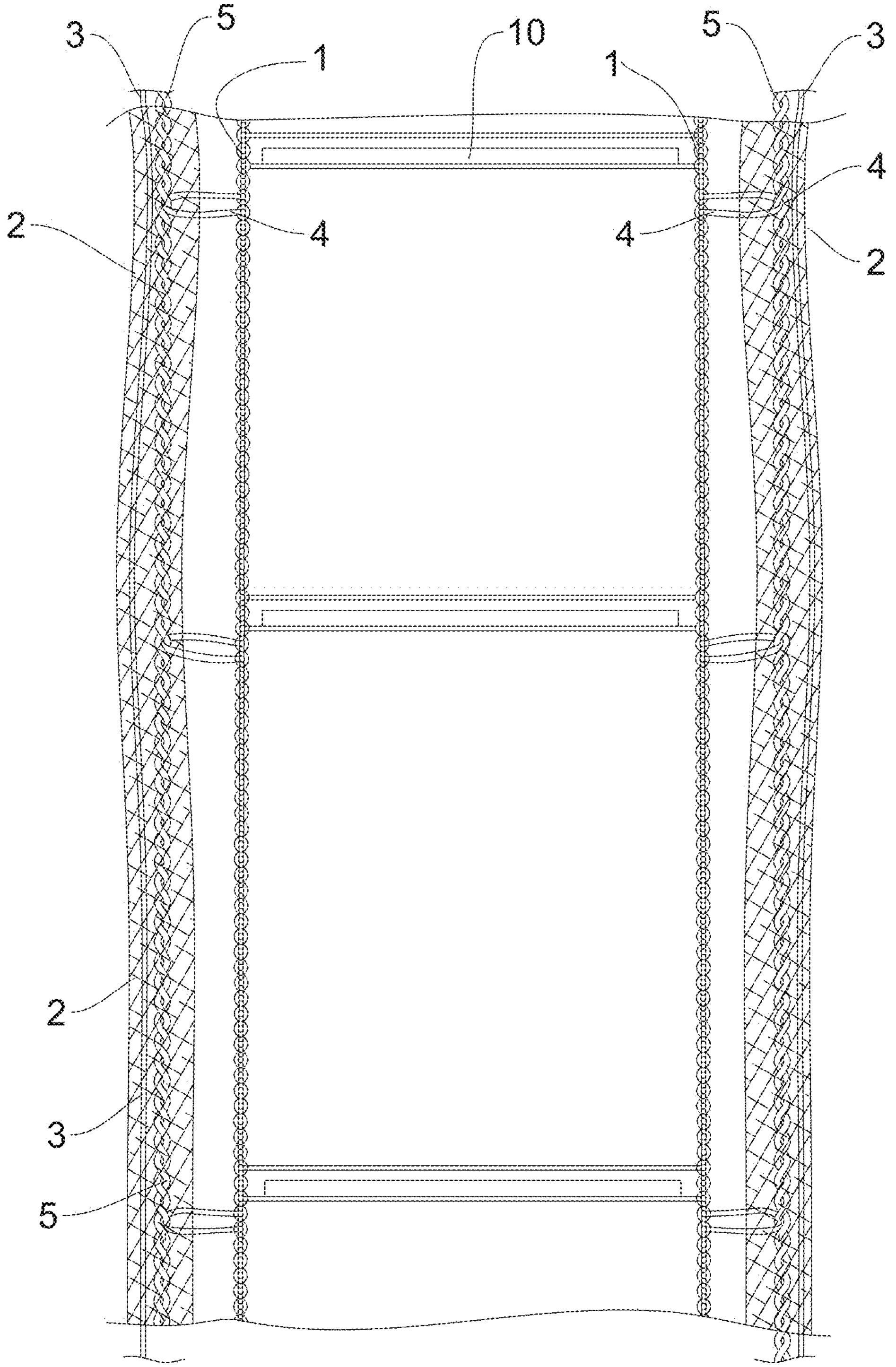
FIG. 5 shows that slats are installed between the ladder strings of the safety lift cord assembly of the present invention.

Referring to FIGS. 1 to 6, the safety lift cord assembly for a window blind 100 of the present invention comprises a ladder unit 1, two sleeves 2, two lift cords 3, multiple retainers 4 and two ropes 5.

The ladder unit 1 includes two ladder strings 11 and multiple transverse strings 12 which are located between the two ladder strings 11. The two ladder strings 11 are parallel to each other. The transverse strings 12 control angular status of slats 10 of the window blind 100.

Figure 6:
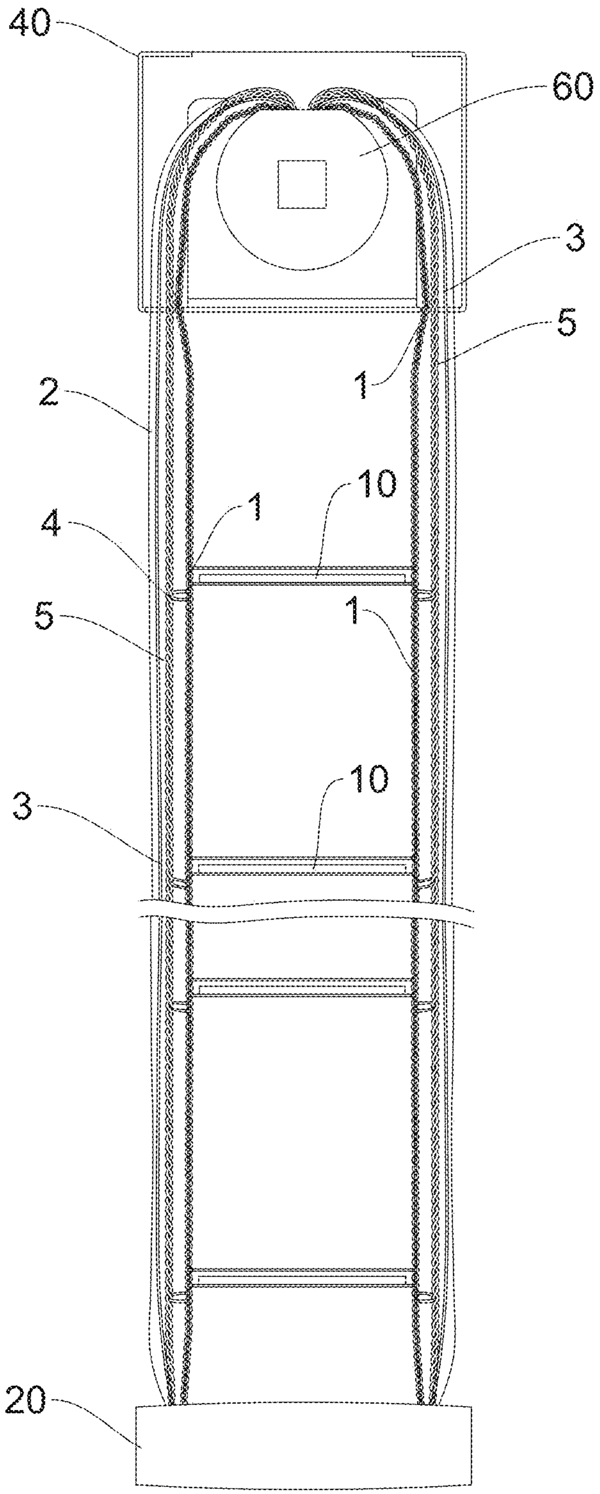
FIG. 6 is a side view of the window blind with the safety lift cord assembly of the present invention.

As shown in FIG. 1, and 3-6, the two sleeves 2 are made of flexible material and located on two ends of the ladder unit 1. The two lift cords 3 respectively extend through the two sleeves 2. The first end of each lift cord 3 is fixed to the bottom rail 20 of the window blind 100, and the second end of each lift cord 3 is connected to a roller 30 located in the top rail 40 of the window blind 100. The two ropes 5 respectively extend through the two sleeves 2. When the users pull the bottom rail 20, the lift cords 3 are released to lower the window blind 100 to a desired height. When the bottom rail 20 is moved upward, the lift cords 3 are scrolled by the rollers 30, and the window blind 100 is collected upward. As shown in FIG. 6, the ropes 5 and the sleeves 2 each have a first end thereof connected to the bottom rail 20 of the window blind 100. A second end of each of the ropes 5 and the sleeves 2 are connected to an angle controller 60 located in the top rail 40 of the window blind 100.

As shown in FIGS. 2-6 and 11, each of the retainers 4 is formed between the ladder strings 11 and the ropes 5. When the lift cords 3 are lifted, the ropes 5 drive the ladder unit 1 and the sleeves 2 are collected. The retainers 4 do not drag the sleeves 2 so that the sleeves 2 are prevented from being torn or damaged.

As shown in FIGS. 3-6, each of the ladder strings 11 includes multiple wires which form multiple rings 111 woven with each other. Each of the ropes 5 includes at least two wires braided with each other. Multiple openings 51 are formed between the at least two wires. Each retainer 4 has a first end thereof formed by extracting one of the multiple wires of the ladder string 11. The first end of the retainer 4 is pulled to be woven to one of the openings 51 of the rope 5, and then is pulled back to be woven to another one of the rings 111 of the ladder string 11 so as to connect the ladder string 11, the retainer 4 and the rope 5 together.

Figure 7A:
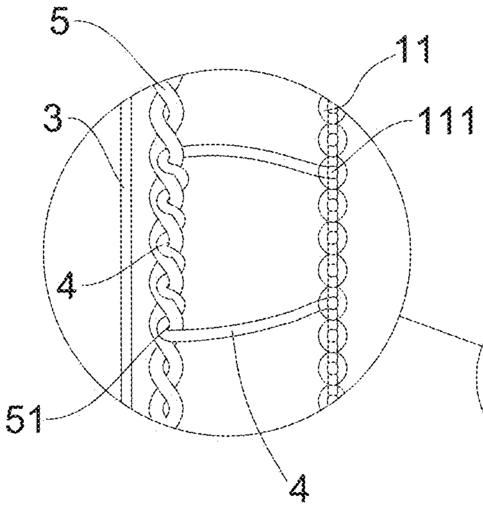
FIG. 7A is an enlarged view to show the connection between the retainer, the rope and the ladder string.
Figure 7:
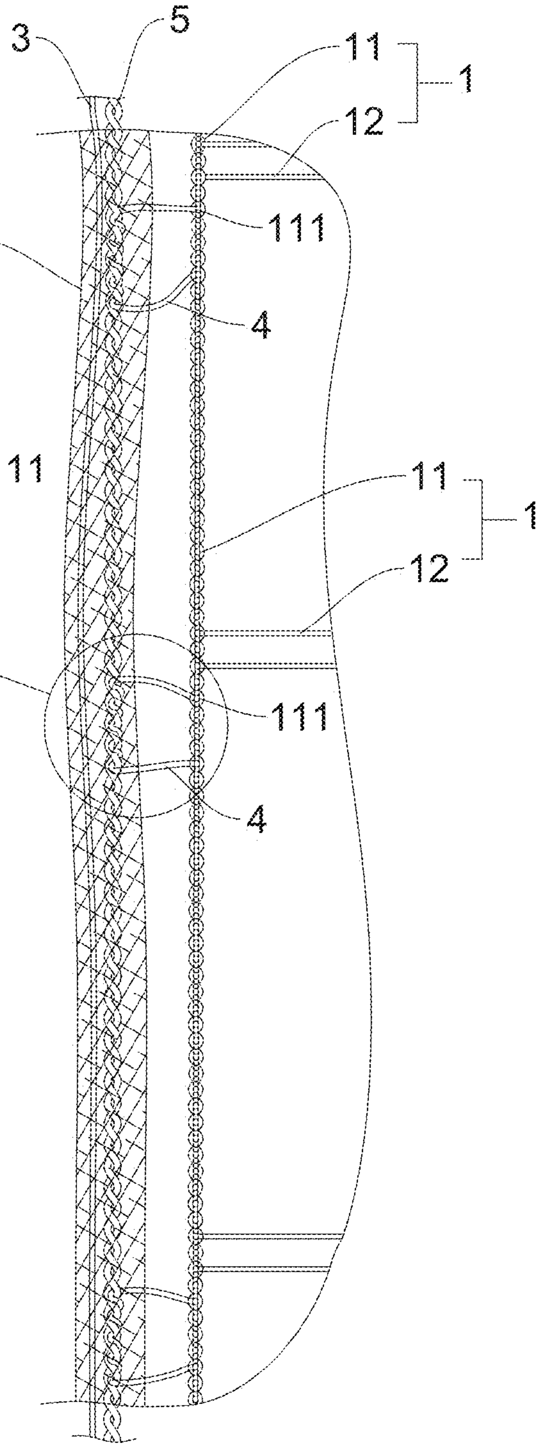
FIG. 7 shows another embodiment of the retainer formed between the rope and the ladder string.
Figure 8:
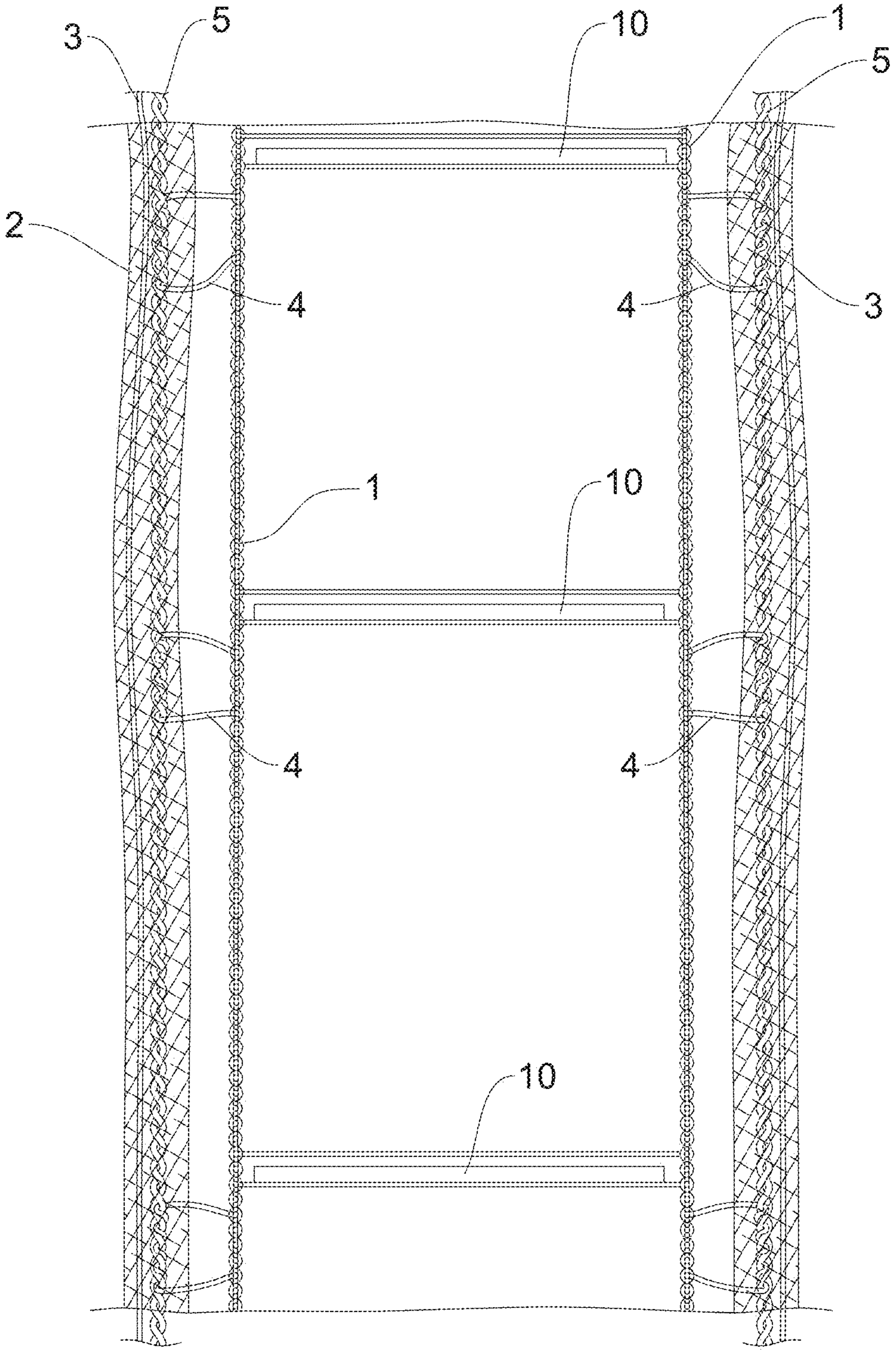
FIG. 8 shows that slats are installed between the ladder strings of the safety lift cord assembly as disclosed in FIG. 7.
Figure 12:
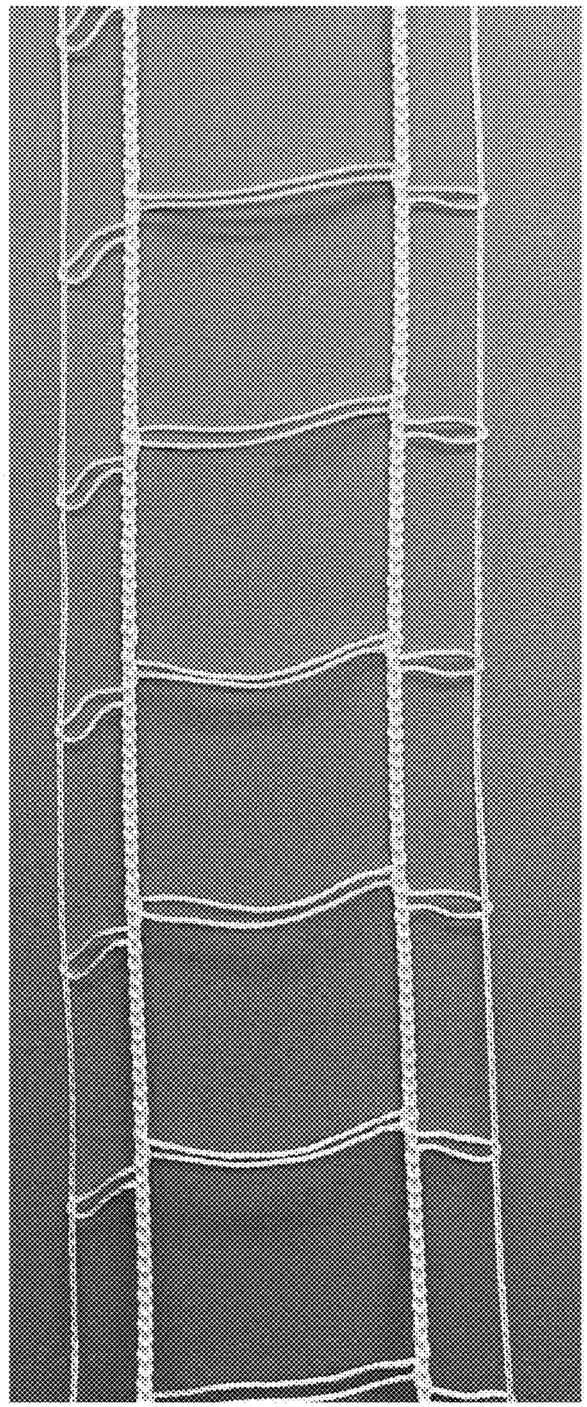
FIG. 12 is a copy of a photo of the safety lift cord assembly of the present invention as disclosed in FIG. 7.

Another embodiment is shown in FIGS. 7-8 and 12, wherein each of the ladder strings 11 includes multiple rings 111 woven with each other. Each of the ropes 5 includes at least two wires braided with each other. Multiple openings 51 are formed between the at least two wires. Each retainer 4 has a first end thereof formed by extracting one of the multiple wires of the ladder string 11. The first end of the retainer 4 is pulled to be woven to multiple openings 51 of the rope 5, and then is pulled back to be woven to another one of the rings 111 of the ladder string 11 so as to connect the ladder string 11, the retainer 4 and the rope 5 together. By this arrangement, the force that applies to the retainer 4 is spread to the rope 5.

As shown in FIGS. 3 to 8, each of the sleeves 2 is a netted sleeve. Alternatively, each of the sleeves 2 can be a flat tube which abuts one of two opposite faces the slats 10 so as to make the slats 10 to be located side by side to reduce light from passing through gaps between the slats 10. Of course, the sleeves 2 can be made of yarns woven with each other, and have different colors or patterns formed thereon.

Figure 9:
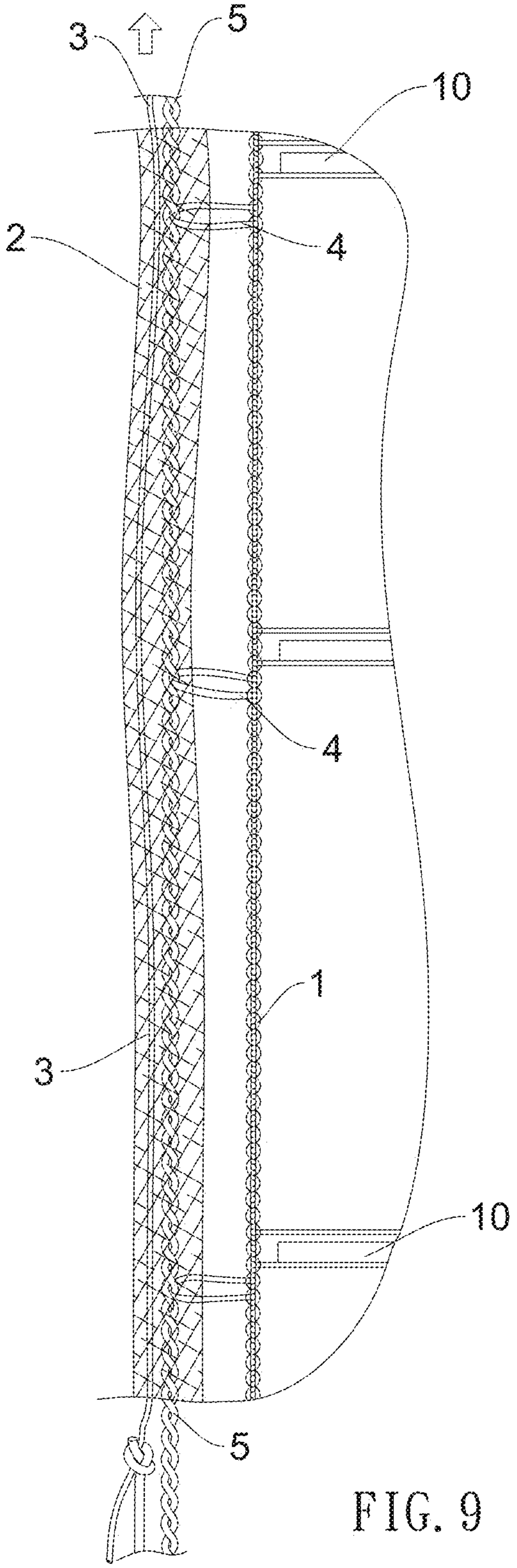
FIG. 9 illustrates replacement of the lift cord.
Figure 10:
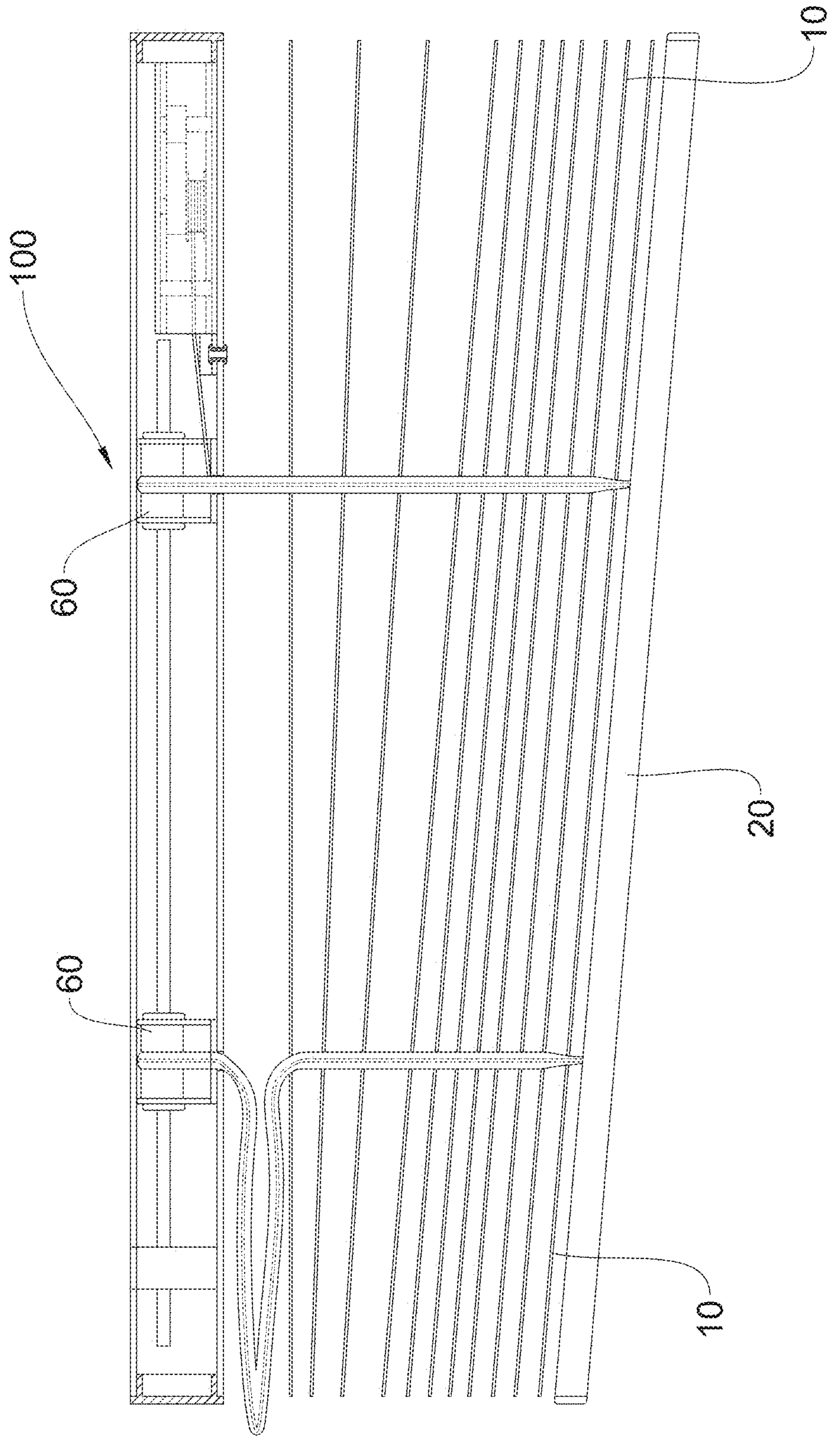
FIG. 10 PRIOR ART
FIG. 10 shows that the slats of a conventional window blind are tilt due to malfunction of the lift cord.
Figure 11:
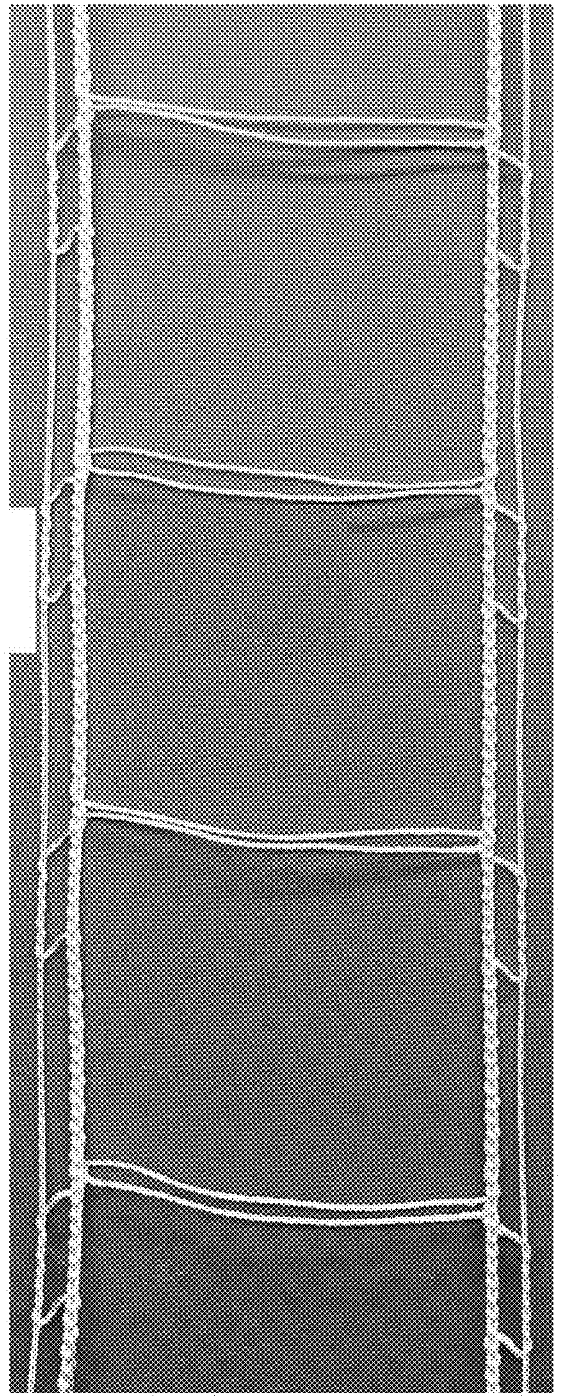
FIG. 11 is a copy of a photo of the product of the safety lift cord assembly of the present invention as disclosed in FIG. 3.

As shown in FIG. 9, when replacing the old lift cord 3, the new lift cord 3 is tied to the old lift cord which is then pulled out from the roller 30. In addition, because the retainers 4 are connected between the ladder string 11 and the rope 5, so that when pulling the lift cord 3, the retainer 4 does not tear the sleeve 2.

While we have shown and described the embodiment in accordance with the present invention, it should be clear to those skilled in the art that further embodiments may be made without departing from the scope of the present invention.

What is claimed is:

1. A safety lift cord assembly for a window blind, comprising:

a ladder unit including two ladder strings and multiple transverse strings which are located between the two ladder strings, the two ladder strings being parallel to each other, the transverse strings adapted to control angular status of slats of a window blind;

two sleeves made of flexible material and located on two ends of the ladder unit, two lift cords respectively extending through the two sleeves, a first end of each lift cord adapted to be fixed to a bottom rail of the window blind, a second end of each lift cord adapted to be connected to a roller located in a top rail of the window blind, two ropes respectively extending through the two sleeves, and multiple retainers formed between the ladder strings and the ropes, when the lift cords are lifted, the ropes drive the ladder unit and the sleeves are collected, the retainers do not drag the sleeves.

2. The safety lift cord assembly for a window blind as claimed in claim 1, wherein each of the ladder strings includes multiple wires which form multiple rings woven with each other, each of the ropes includes at least two wires braided with each other, multiple openings are formed between the at least two wires, each retainer has a first end thereof formed by extracting one of the multiple wires of the ladder string, the first end of the retainer is woven to one of the openings of the rope and is woven to another one of the rings of the ladder string so as to connect the ladder string, the retainer and the rope together.

3. The safety lift cord assembly for a window blind as claimed in claim 1, wherein each of the ladder strings includes multiple wires which form multiple rings woven with each other, each of the ropes includes at least two wires braided with each other, multiple openings are formed between the at least two wires, each retainer has a first end thereof formed by extracting one of the multiple wires of the ladder string, the first end of the retainer is woven to multiple openings of the rope and is woven to another one of the rings of the ladder string so as to connect the ladder string, the retainer and the rope together.

4. The safety lift cord assembly for a window blind as claimed in claim 1, wherein each of the sleeves is a netted sleeve.

5. The safety lift cord assembly for a window blind as claimed in claim 1, wherein the sleeves each have different colors or patterns formed thereon.

6. The safety lift cord assembly for a window blind as claimed in claim 1, wherein each of the sleeves is a flat tube which is adapted to abut one of two opposite faces the slats.

7. The safety lift cord assembly for a window blind as claimed in claim 6, wherein the sleeves are made of yarns woven with each other.

* * * * *